United States Patent
Nonaka

(10) Patent No.: US 6,407,802 B1
(45) Date of Patent: Jun. 18, 2002

(54) MULTI-POINT DISTANCE MEASURING APPARATUS

(75) Inventor: Osamu Nonaka, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/583,013

(22) Filed: May 30, 2000

(30) Foreign Application Priority Data

Jun. 3, 1999 (JP) .......................... 11-156553

(51) Int. Cl.⁷ .................. G01C 3/00; G03B 3/10; G03B 13/34
(52) U.S. Cl. ...................... 356/3.08; 396/123
(58) Field of Search ............. 356/3.06, 3.08, 356/316; 250/201.4, 201.6; 396/80, 96, 104, 106, 120, 121, 122, 123, FOR 703, FOR 810

(56) References Cited

U.S. PATENT DOCUMENTS

| | | | |
|---|---|---|---|
| 4,255,029 A | 3/1981 | Freudenschuss | |
| 4,592,638 A * | 6/1986 | Kaneda et al. | 396/80 |
| 4,992,817 A * | 2/1991 | Aoyama et al. | 396/125 |
| 5,568,222 A * | 10/1996 | Aoyama | 396/123 |
| 5,589,910 A | 12/1996 | Saito et al. | |
| 5,652,926 A | 7/1997 | Saito | |
| 5,784,654 A | 7/1998 | Saito et al. | |
| 5,805,939 A * | 9/1998 | Hamamura et al. | 396/123 |
| 6,038,405 A * | 3/2000 | Kageyama | 396/92 |
| 6,160,613 A * | 12/2000 | Takasaki et al. | 356/3.08 |

FOREIGN PATENT DOCUMENTS

| JP | 55-35399 | 3/1980 |
|---|---|---|
| JP | 7-167646 | 7/1995 |

* cited by examiner

*Primary Examiner*—Thomas H. Tarcza
*Assistant Examiner*—Fred H Mull
(74) *Attorney, Agent, or Firm*—Frishauf, Holtz, Goodman & Chick, P.C.

(57) ABSTRACT

A multi-point distance measuring apparatus has a plurality of distance measuring points for performing a multi-point distance measurement. Sensor arrays detect an image pattern at each distance measuring point in the picture. A control circuit determines a distance measuring mode for each distance measuring point, based upon the output signal of the sensor arrays.

12 Claims, 10 Drawing Sheets

MULTI-POINT DISTANCE MEASURING APPARATUS

CROSS-REFERENCE TO RELATED APPLICATIONS

This application is based upon and claims the benefit of priority from the prior Japanese Patent Application No. 11-156553, filed Jun. 3, 1999, the entire contents of which are incorporated herein by reference.

BACKGROUND OF THE INVENTION

The present invention relates to a distance measuring apparatus.

There are two kinds of distance measuring apparatus, that is an active mode distance measuring apparatus projecting distance measuring light onto an object and measuring distance by means of reflected signal light thereof, and a passive mode distance measuring apparatus using image patterns of an object. However, in the active mode there is a disadvantage of having a weakness to low-reflective or distant objects, and in the passive mode there is a disadvantage of not being capable of precisely measuring the distance in a dark scene where image patterns can not be obtained easily or the distance to soft and monotonous objects.

Therefore, in Jpn. Pat. Appln. KOKAI Publication No. 55-35399, Jpn. Pat. Appln. KOKAI Publication No. 7-167646 or the like, methods of measuring a distance corresponding to the surroundings of an object by using said two modes in combination are disclosed.

As described above, cameras being capable of bringing an object into focus precisely even in a scene hard to deal with only by one mode by changing an active mode over to a passive mode or vice versa have been conventionally proposed, and there are also examples of commercial production.

However, conventional distance measuring apparatus only combine two modes, or when the distance to an object can not be measured precisely by one mode, they only change one mode over to the other mode and measure the distance to said object. And it has not been discussed sufficiently to which part of the picture the distance should be measured.

Further, so-called multi-point distance measurable cameras being capable of measuring the distances to many points of a picture have increased in number, but such cameras take more time and show a higher probability of failed distance measurement as the distance measuring points increase in number.

BRIEF SUMMARY OF THE INVENTION

Therefore, the object of the present invention is to provide a distance measuring apparatus being capable of bringing an object into focus fast and precisely.

In order to attain the object, according to the first aspect of the present invention, a multi-point distance measuring apparatus of a camera having a plurality of distance measuring points comprises:

a light source projecting distance measuring light onto an object;

a sensor array detecting an image pattern of each distance measuring point in the picture; and a control circuit determining whether distance measuring light should be projected or not from the light source onto the each distance measuring point, based upon the output signals of the sensor array.

Further, according to the second aspect of the present invention, a multi-point distance measuring apparatus being capable of measuring distances to a plurality of points in the picture comprises:

a light source projecting light onto an object;

a first judging means judging whether the measurements of the distances to the plurality of points using the images of an object are possible or not;

a second judging means judging whether the measurements of the distances to the plurality of points involving light projection from the light source are possible or not; and a control circuit making the distance measurement data of the points ineffective with respect to which distance measurement and light projection have been decided to be impossible by the first judging means and the second judging means respectively.

Further, according to the third aspect of the present invention, a multi-point distance measuring apparatus being capable of measuring distances to a plurality of blocks comprises:

a light source projecting light onto an object;

two line sensors receiving divided two images respectively in order to measure the distance to the object; and a control circuit selectively changing over between passive distance measuring mode measuring distance based upon the image patterns outputted from the two line sensors and active distance measuring mode measuring distance, based upon the receiving position of reflected light from the object onto which light is projected by the light source on the line sensors, wherein the control circuit changes over between the passive distance measuring mode and the active distance measuring mode per block, based upon the shape of the image patterns obtained by the line sensors.

Further, according to the fourth aspect of the present invention, a multi-point distance measuring apparatus of a camera comprises:

a sensor array detecting image data in the picture;

an integrating means integrating the output of the sensor array;

a deciding means deciding the relation of the image patterns obtained by the sensor array and the position of the image patterns in the picture;

a judging means judging a most suitable position for the main object among a plurality of predetermined points in the picture, based upon the change of image patterns corresponding to the plurality of points; and a determining means determining the sensor area used for measuring distance according to the result of the judgment by the judging means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a view illustrating active-AF using a passive sensor array 6a; and

DETAILED DESCRIPTION OF THE INVENTION

Figure 1:
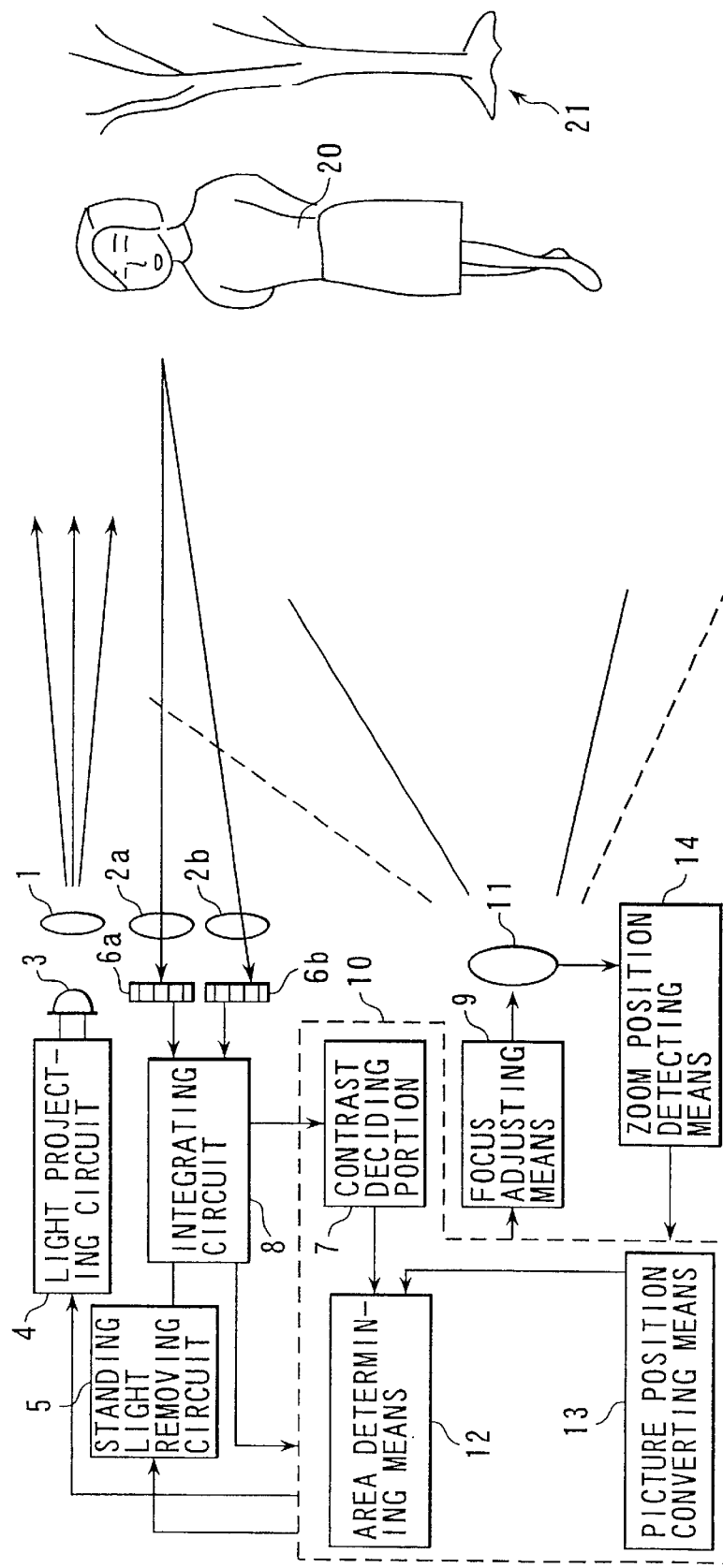
FIG. 1 is a view illustrating the basic concept of the first embodiment of the present invention.

First, the embodiments of the present invention will be described in summary. These embodiments are based upon the assumptions that for example the human figure is a main object with a high probability and that the contrast of the image patterns of the human figure is not so high particularly with respect to a face. That is, an object showing an extremely large contrast change is not considered to be a main object. Further, taking it into consideration that a precise distance measurement result may not be able to be obtained when there are images of low-contrast human figures and such high-contrast images at the same time, distance measurement points having a large contrast variation must be eliminated. However, as low contrast objects not only human figures, but also the sky and the ground are included, these embodiments have taken also this point into consideration.

Now, the embodiments of the present invention will be described in detail with reference to the drawing:

(First Embodiment)

First, the principle of multi-AF distance measurement mainly using passive AF upon which this embodiment is based will be described mainly with reference to FIGS. 6A and 6B.

Figure 6B:
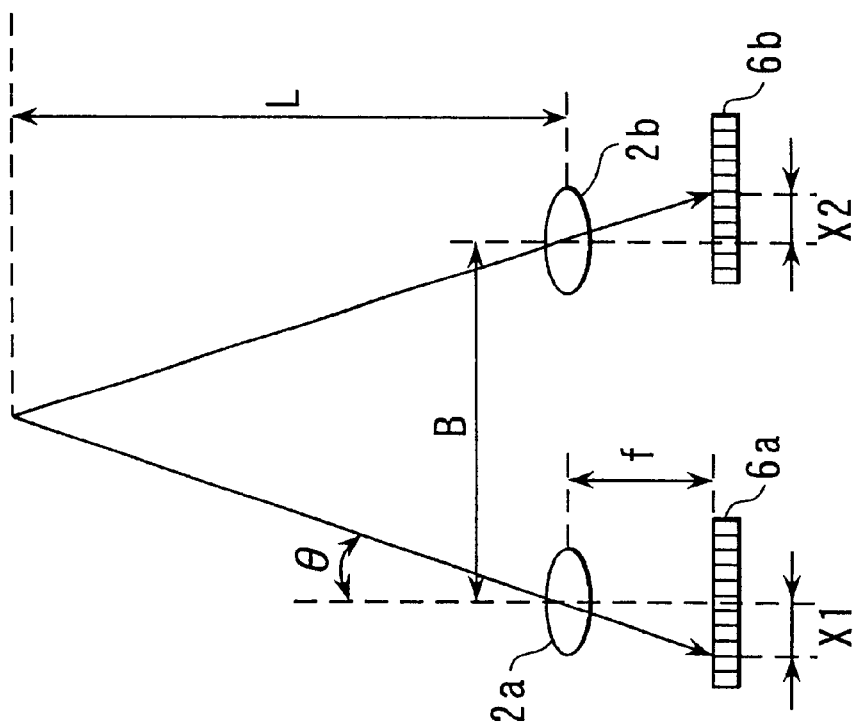
FIGS. 6A and 6B are views illustrating the principle of multi-AF distance measurement mainly using passive-AF.
Figure 6A:
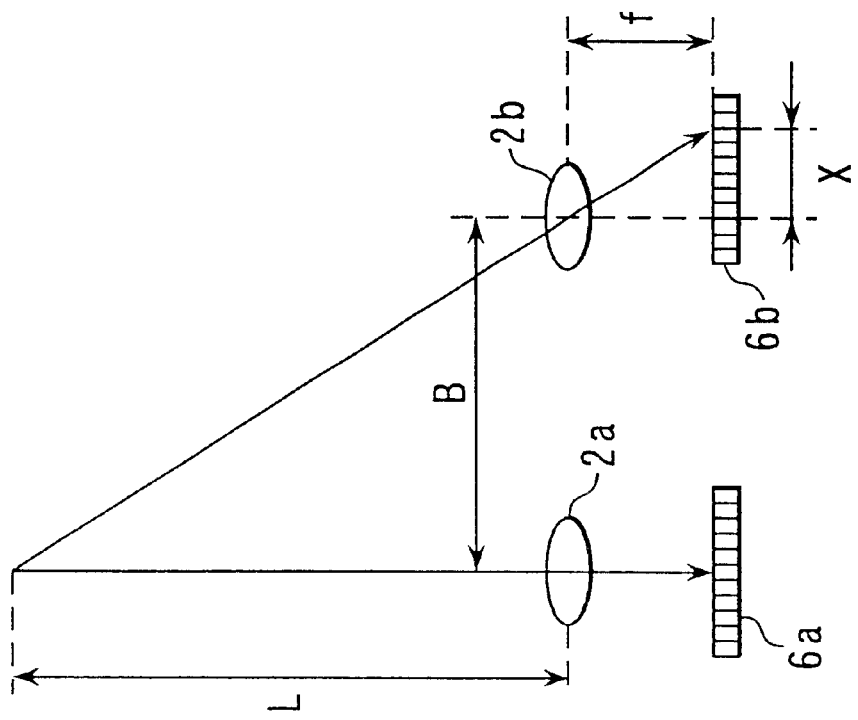

The signal light from a distance measurement object is, as shown in FIG. 6A, passed through light-receiving lenses 2a and 2b and is received by sensor arrays 6a and 6b.

When among luminance distributions (image patterns) generated by the signal light received by this sensor array 6a the luminance distribution located on the light axis of the light-receiving lens 2a is taken as a basis, and this luminance distribution as a basis is detected at a distance x from the light axis of the light-receiving lens 2b on the sensor array 6b, the distance L to the distance measurement object is obtained, as is obvious from the principle of triangular distance measurement, from the following formula:

$$L = B \times f / x$$

wherein B is a distance between the principal points of the two light-receiving lenses 2a and 2b (baseline length), and f is a focal distance of these light-receiving lenses 2a and 2b. By using such a method, the distance in the direction of light axis can be measured.

Further, when the sensor arrays 6a and 6b are sufficiently long in the direction of baseline length, as shown in FIG. 6B, with the position of the luminance distribution as a basis being offset by a distance x1 from the light axis of the light-receiving lens 2a, the distance L to the distance measurement object is obtained, based upon the distance x2 at which the same luminance distribution is generated on the sensor array 6b, from the following formula:

$$L = B \times f / (x1 + x2)$$

wherein the distance can be measured within an angle distant from the light axis of the light-receiving lens 2a by $\theta = \arctan(x1/f)$.

Thus, by offsetting the position of the luminance distribution as a basis, multi-point distance measurement being capable of measuring the distances to plurality of points in the transverse direction of the picture of a camera becomes possible when the baseline length of the distance measuring apparatus is located corresponding to the transverse direction of the camera.

Figure 2A:
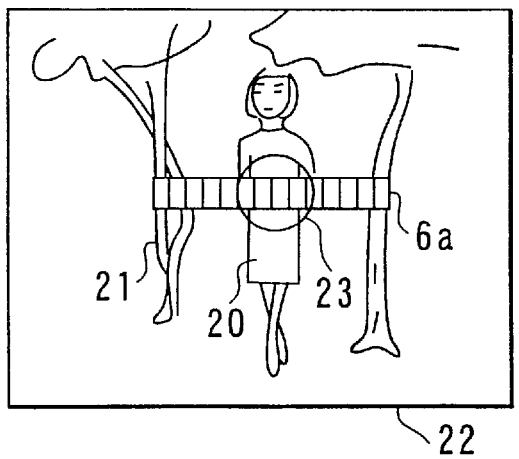
FIGS. 2A to 2F are views showing the distribution condition of the contrast corresponding to each scene filmed respectively.

As is obvious from the principle of such a distance measurement, passive AF has an advantage of being capable of measuring the distances to many points only by changing the position of the sensor as a basis. On the other hand, however, it is difficult to bring a low contrast object into focus, since the distances are measured by using the luminance distributions (image patterns) of an object. Particularly in a scene as shown in FIG. 2A, if there is a high contrast object in the background, since the contrast of a human figure is relatively low, the possibility of a failed distance measurement becomes higher due to the influence of the luminance difference from the background such as not the human figure as a main object, but the background is brought into focus. Further, even in passive AF, if the distance measurement points increase in number, distance measurement takes more time proportionally thereto.

On the other hand, in active AF as described below, since the distance measuring light is projected onto an object from the camera side and the distance measurement is performed by the reflected signal light from the object, a precise distance measurement can be performed in general even if the main object has a low contrast. However, there is a disadvantage that the configuration for projecting light onto each distance measurement point becomes complex when multi-point distance measurement is to be performed. Further, as described below, since active mode AF takes out only reflected signal light, light component other than reflected signal light (standing light) must be removed. Undesirably this generates a time lag.

As is obvious from those described above, if no measures for reducing the distance measurement points or for avoiding to measure the distance to the same point repeatedly are taken in either passive AF or active AF distance measuring mode, a multi-AF apparatus using active mode and passive mode in combination can not be realized effectively.

Figure 7:
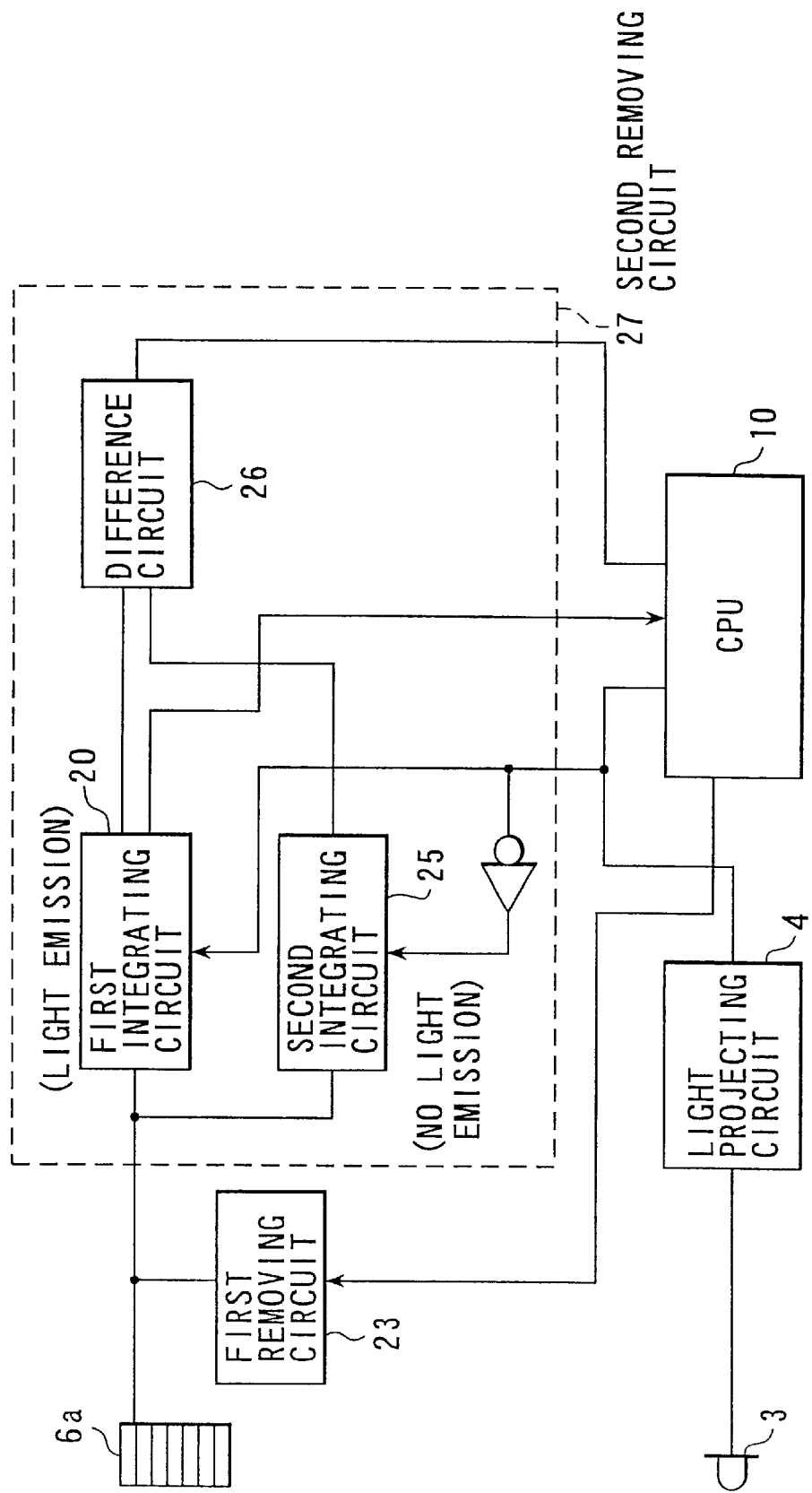

Now, referring to FIG. 7, active AF using the sensor array 6a of the sensor arrays 6a and 6b used in passive mode. Active AF is a distance measurement using light projected from the camera side, and here two standing light removing circuits are provided in order to add a function of standing light removal. These circuits can realize a high-precision active AF showing a good S/N. That is, the first removing circuit separates reflected signal light which is pulse light projected from the camera side and standing light by the frequency characteristics thereof, and in order to integrate the sensor output further in two parts from which standing light has been removed to a certain degree, the second removing circuit 27 including two integrating circuits 20 and 25 is provided. The first integrating circuit 20 integrates synchronized with the emission from IRED3, and the second integrating circuit 25 integrates for the same period tINT as in the first integration.

That is, of the outputs of the two integrating circuits 20 and 25, the one includes reflected signal light from IRED3, and the other includes no reflected signal light component. Therefore, the output of a differential circuit 26 using the difference between these represents only reflected signal light component.

Thanks to such a configuration, even if the first removing circuit 23 can not remove standing light due to the limit of the circuit form thereof, reflected light signal component can be taken out securely by using the second removing circuit including the first and second integrating circuits 20 and 25 as well as the differential circuit 26 in combination. Further, if the first and second removing circuits 23 and 27 are put out of operation, this active AF functions as passive AF.

Figure 8:
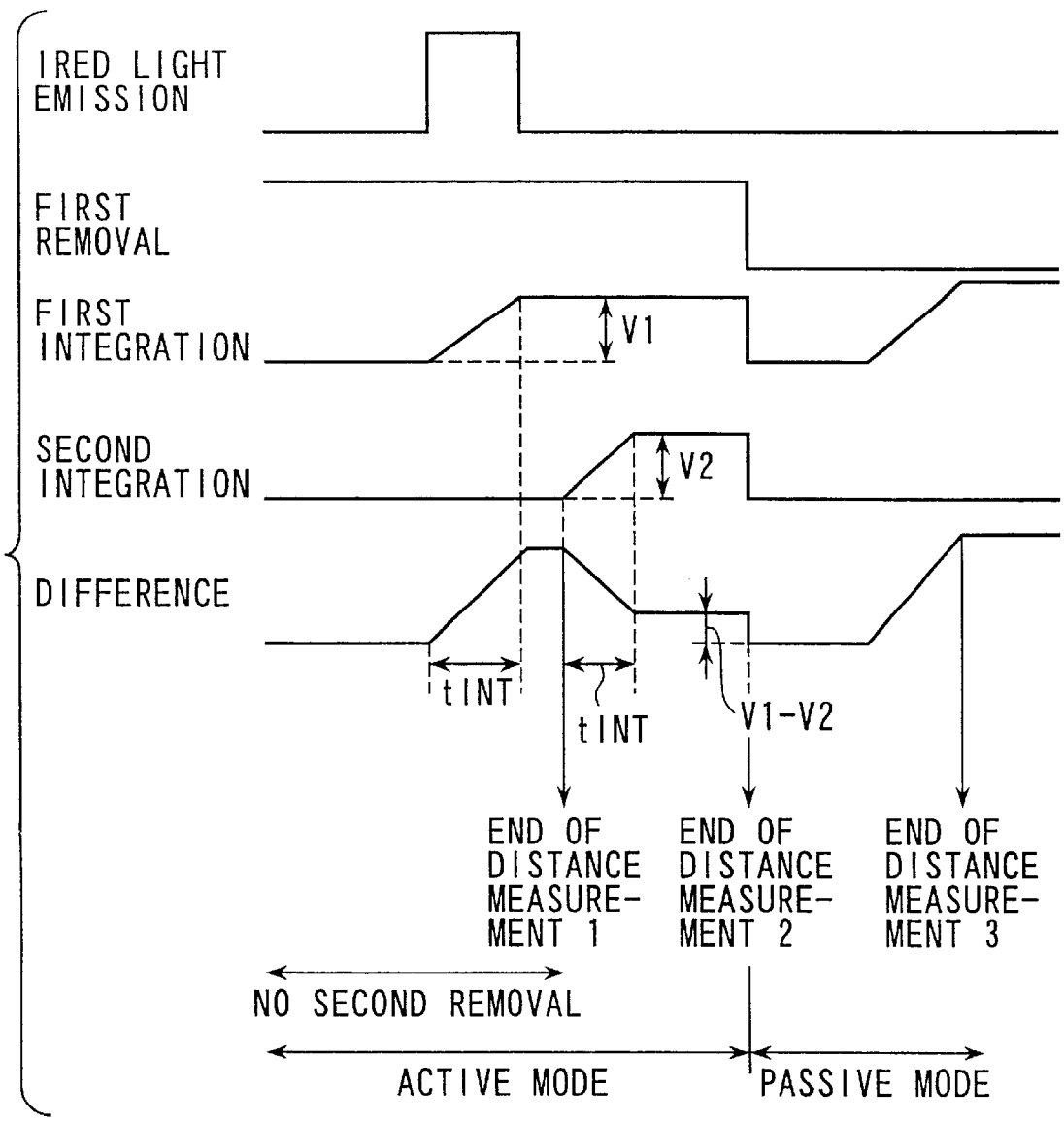
FIG. 8 is a timing chart showing the operation of the configuration shown in FIG. 7.

FIG. 8 is a timing chart showing the operation of the configuration shown in FIG. 7. In this figure the operation is divided into the first half with active mode and the second half with passive mode by the ON-OFF operations of the first removing circuit 23, and the first half can be further divided into two parts according to the existence or nonexistence of the emission from IRED.

In the first half with active mode, an integral voltage V1 found when emitted from IRED and an integral voltage V2 found when not emitted from IRED are shown, however, when V1 is high and V2 is low, reflected signal light can be detected without finding a difference. In such a case, the distance is measured as it is by using this signal (In the figure, end of distance measurement 1).

However, when a spot shape of reflected signal light is not obtained due to an insufficient removal of standing light in a bright scene, an integration (amount of integration V2) is made with no light being projected, and the difference from the result of integration in case of light projection (V1−V2) is found by the differential circuit 26. And if a spot shape is obtained by inputting this difference (V2−V1) into CPU 10, the distance may be measured on the principle of active AF based thereupon. If the distance can be measured by doing so, the distance measurement is ended at this time (In the figure, end of distance measurement 2).

On the other hand, if a spot shape is not obtained by doing so, the scene is ill fitted for active AF, and therefore, the distance may be measured by changing over to passive AF. For example, no reflected signal light comes back from an object with a very low reflectivity or from a distant object. In such a scene, by putting the first removing circuit 23 and the second removing circuit 27 out of operation, the distance may be measured in passive AF mode using image patterns (In the figure, end of distance measurement 3).

Now, an embodiment according to the present invention using a multi-point distance measuring circuit provided with the functions of both active AF and passive AF will be described.

FIG. 1 is a view illustrating the basic concept of this embodiment. Here, the integrating circuit of the sensor output divided into two circuits in FIG. 7 is simplified to an integrating circuit 8, the complex time chart for removing standing light as shown in FIG. 8 is also simplified for illustration, and when the standing light removing circuit 5 is operated, active AF mode using distance measuring light emitted from a light-emitting element 3 including a infrared light-emitting diode (IRED) or the like is adapted to be enabled. On the other hand, when the standing light removing circuit 5 is not operated, passive AF is an enabled mode.

10 is an operation control circuit (CPU) including an one-chip microcomputer or the like governing the sequence of the camera on the whole.

When the distance is measured, the light-emitting element 3 including a infrared light-emitting diode (IRED) or the like is driven by a light projecting circuit (driver) 4, and light is projected via a light projecting lens 1 onto a human figure as a main object 20. Reflected light from the main object 20 is incident via light receiving lenses 2a and 2b on the sensor arrays 6a and 6b. The object images are converted as image patterns into electric signals by these sensor arrays 6a and 6b, and are inputted into an integrating circuit 8 performing an integrating operation. At this time, standing light is removed in the standing light removing circuit 5.

CPU 10 controls the above-described distance measuring circuit sequentially, determines the focus adjusting distance corresponding to the obtained image patterns and the distance measuring signals, and controls the focus position of a zoom lens 11 via a focus adjusting means 9. The position of the zoom lens 11 at this time is detected by a zoom position detecting means 14 including an encoder using a photo interrupter or the like, and is inputted into CPU 10.

As shown in the figure, CPU 10 has functions of a contrast deciding portion 7, an area determining means 12 and a picture position converting means 13.

The picture position converting means 13 makes a decision based upon the present zoom position detected by the zoom position detecting means 14 and upon the image patterns detected on the sensor arrays 6a and 6b by converting the sensor part on which the image patterns were obtained into a corresponding position in the picture. The contrast deciding portion 7 detects the contrast of the image patterns obtained from the sensor arrays 6a and 6b or the distribution of light and shade, and decides a most suitable position for the main object from the change of the image patterns corresponding to a plurality of predetermined points in the picture. The area determining means 12 determines a suitable sensor area to be used for measuring the distance based upon the output of the contrast deciding portion 7 and upon the output of the picture position converting means 13. 21 represents a tree standing behind the human figure as a main object 20.

(Second Embodiment)

Now, the second embodiment will be described. In this embodiment, a scene as shown in FIG. 2A, is supposed to be the scene to be filmed. FIG. 2A shows a composition in the photograph or in the finder picture 22, for example, a scene in which a human figure is standing in the forest. When the human FIG. 20 is standing in the shade of a tree, the tree 21 is dark, but the background thereof is bright, then the image of the object thrown on the sensor array 6a has, as shown in FIG. 2B, a low contrast on the sensor part 20a corresponding to the human figure 20 and a high contrast on the sensor part 21a corresponding to the tree 21 in the background.

Figure 2B:
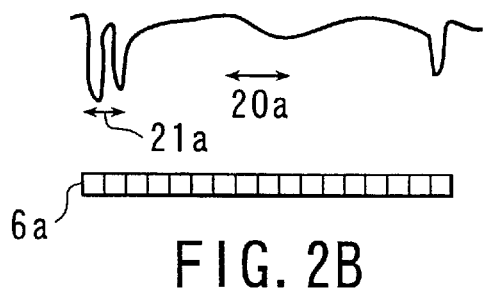

In FIG. 2A the zoom lens 11 is set on the wide (wide angle) side, and in FIG. 2B the zoom lens 11 is set on the tele (telescopic) side. In a scene as shown in FIG. 2A, even if the face of the human figure 20 occupies most of the detecting portion of the sensor array 6a as in FIG. 2C, the distance is often measured imprecisely due to a higher contrast of the tree 21 in the background as shown in FIG. 2D. Although the face of the human figure 20 has the black and white of the eyes, there are only a shadow thrown by the nose and a shade of the image made by the three-dimensional shape of the cheeks in general, and frequently the face of the human figure does not have such a high contrast as the shadow of the tree 21 in the background, the pillar, the frame of a window or the like.

Figure 3A:
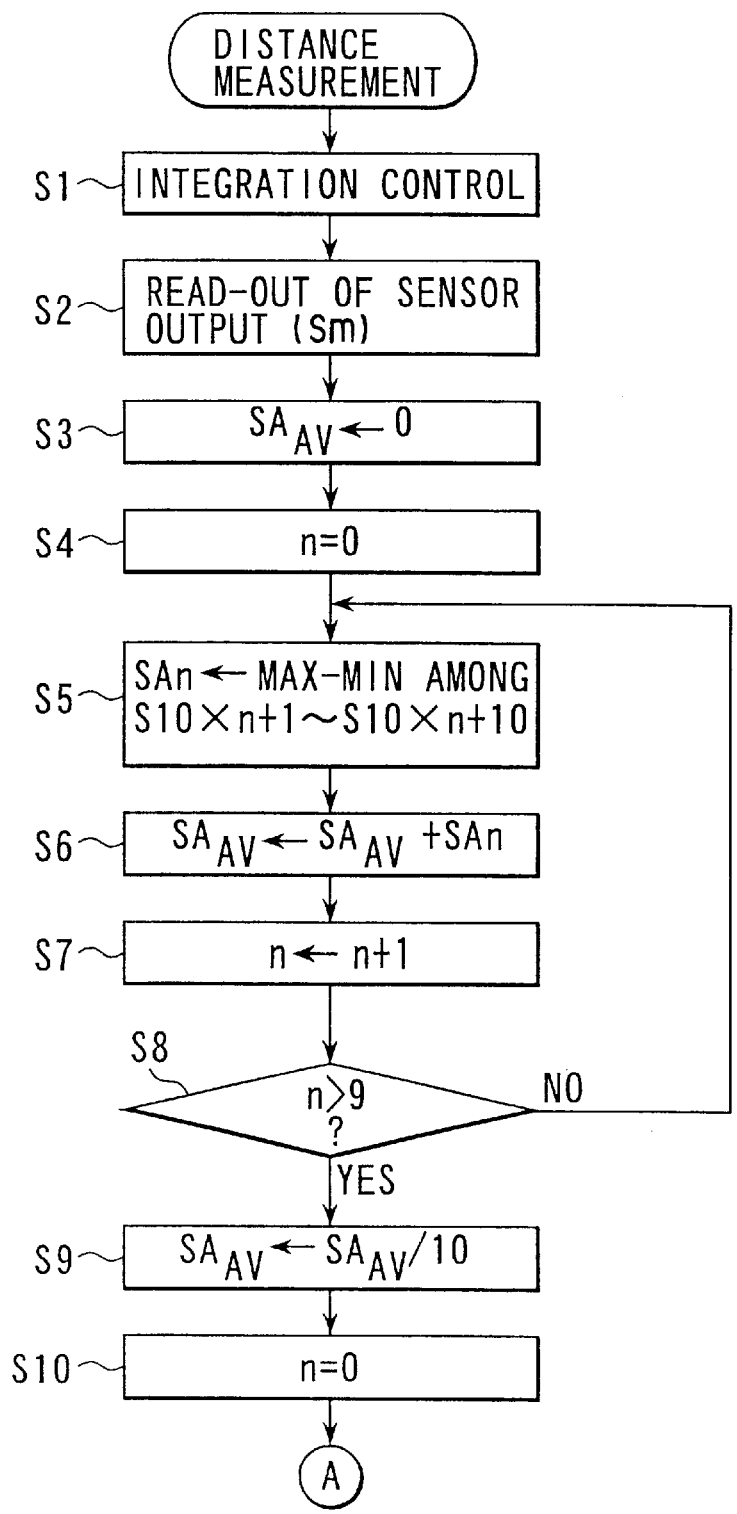
FIGS. 3A and 3B are flow charts illustrating a method of bringing an object into focus according to the second embodiment of the present invention respectively.
Figure 3B:
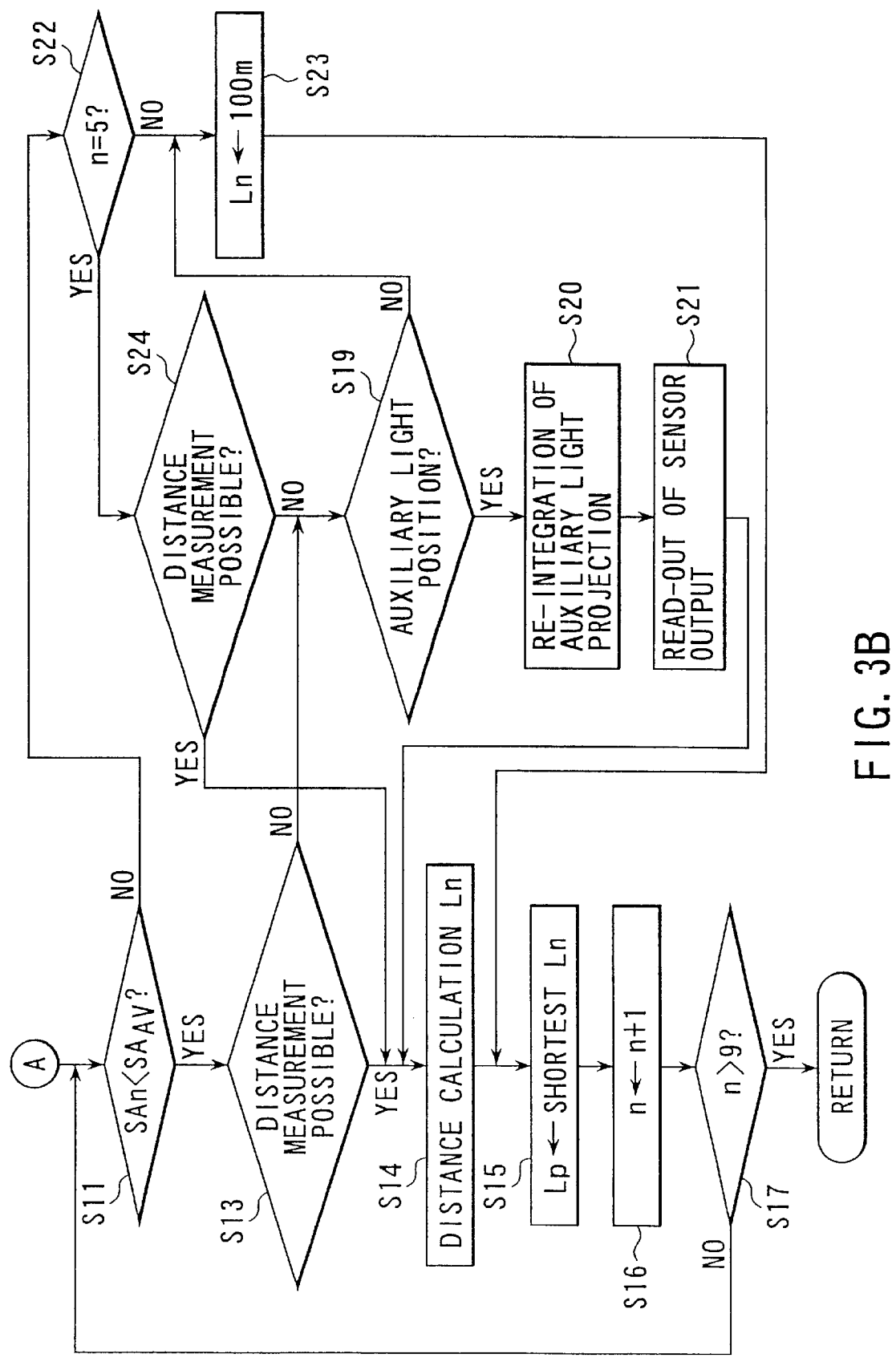

FIGS. 3A and 3B are flowcharts illustrating a method of bringing a human figure 20 into focus precisely in such a scene. Here, the sensor array 6a is assumed to include a hundred sensors, and in this embodiment these sensor are divided into ten parts (blocks) including ten sensors respectively.

Figure 4A:
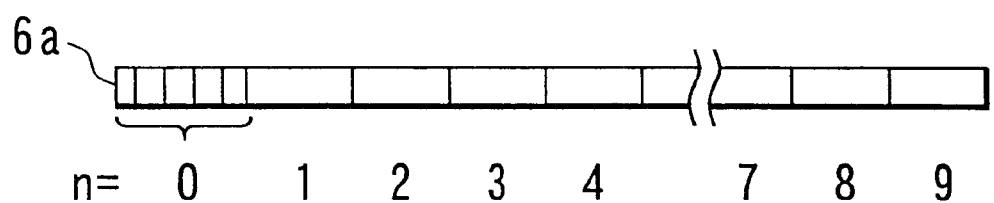
FIGS. 4A and 4B are views showing the configuration of a blocked sensor array 6a respectively.

Sn represents the output of each sensor, and n represents the n-th block of the sensor array 6a as shown in FIG. 4A. Further, SAn in the flowcharts represents the contrast of the image patterns in the n-th block.

First, in Step S1 integration control forming suitable image patterns is performed by controlling the integration of the light which is incident to the sensor array 6a. Various arts are known with respect to this such as one performing control by the sensor to which the brightest light is incident, one using only a particular part of the sensor array 6a, one using the difference between the brightness and the darkness, or the like. In this embodiment any known method can be used. In Step S2 the output of each sensor is read out by CPU 10, and data Sm (m represents the m-th sensor) shall be obtained.

Next, after the average value SAAV of the contrast values in all the blocks has been initialized (Step S3), and also after the variables n representing the blocks of the sensors have been initialized (Step S4), the loop including Steps S5 to S8 is begun in order to detect the contrast of each block.

In Step S5 the contrast value (SAn) of each block is found by calculating the difference between the data of the sensor outputting the maximum amount of light and the data of the sensor outputting the minimum amount of light in the block represented by n and by calculating the value MAX–MIN of the sensor data of the block.

In Steps S6 and S7, in order to calculate an average value of the values MAX–MIN of the blocks, SAns are added to SAAV initialized in Step S3 sequentially. After the values MAX–MIN of all the blocks of n=0 to 9 have been added by the loop flow, Step S8 makes a decision of YES and Step S9 is begun. In Step S9, SAAV is divided by the number of the blocks 10. The value obtained at this time is a value (SAAV) representing an average value of the contrast values of all the blocks.

Figure 2C:
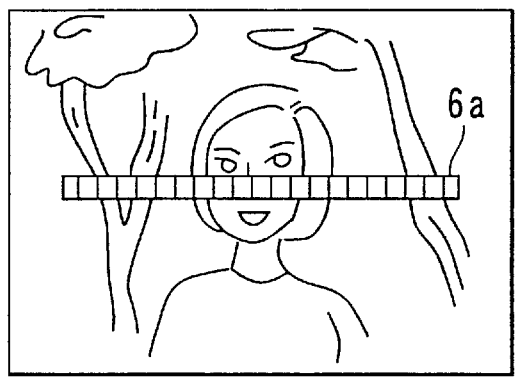
Figure 2D:
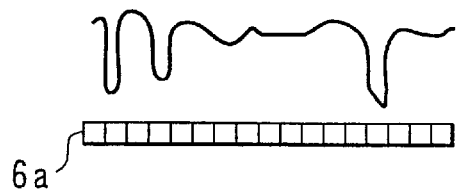

By detecting whether the contrast of each block is high or low in order to judge the effectiveness of each block, a distance measuring apparatus performing no failed distance measurement due to the influence of a high-contrast background when a scene as shown in FIG. 2A or FIG. 2C is filmed can be provided.

In Step S10 the variable n representing each block is initialized, and in Step S11 the found average contrast value SAAV and the contrast value of each block (difference between the MAX output and the MIN output in 10 sensors) are compared sequentially. By this, all the points having a higher contrast value than the average value are excluded as unsuitable for distance measurement, and the sequence is branched into Step S22. However, since the data in the central block is important, it is judged in Step S22 whether n is equal to 5 (n=5) or not, and when n is equal to 5 (n=5), the sequence is branched into Step S24. When n is not equal to 5, the sequence proceeds to Step S23, and the distance Ln is fixed to 10 m. By setting a high value at this time, the shortest distance data selected among the data at all the distance measurement points at the end of Step S15 is made ineffective so that the particular distance measurement range may not be selected. This means also that a distance at which the landscape is brought into focus at the object depth has been selected even if all the data show the same 100m. By reducing the distance measurement objects in number by such a method, the distance measurement speed can be increased. In Step S24 it is judged whether the distance measurement is possible or not based upon whether the contrast value is sufficiently high for comparing the positions of the image patterns in passive AF.

On the other hand, with respect to the blocks which have been judged to have a suitable contrast in Step S11, the sequence is branched into Step S13, and as in Step S24 described above, it is judged whether the distance measurement is possible or not based upon whether the contrast value is sufficiently high for comparing the positions of the image patterns in passive AF.

When the distance measurement was judged to be possible at this time, the distance is calculated according to the principle of triangular distance measurement described in FIGS. 6A and 6B (Step S14). And, if the distance measurement by passive AF is not suitable because two image patterns on the line sensors 6a and 6b in FIGS. 6A and 6B can not be correlated with each other due to a too low contrast, the sequence is branched from Step S13 into S19, and it is decided whether the block is in an auxiliary light position or not.

Now, this auxiliary light position will be described. When an infrared light-emitting diode (IRED) is used as an auxiliary light, IRED has a small light-emitting area and is not suitable for projecting light onto a wide range. So, light is projected only onto points at which an object exists with a high probability.

Figure 4B:
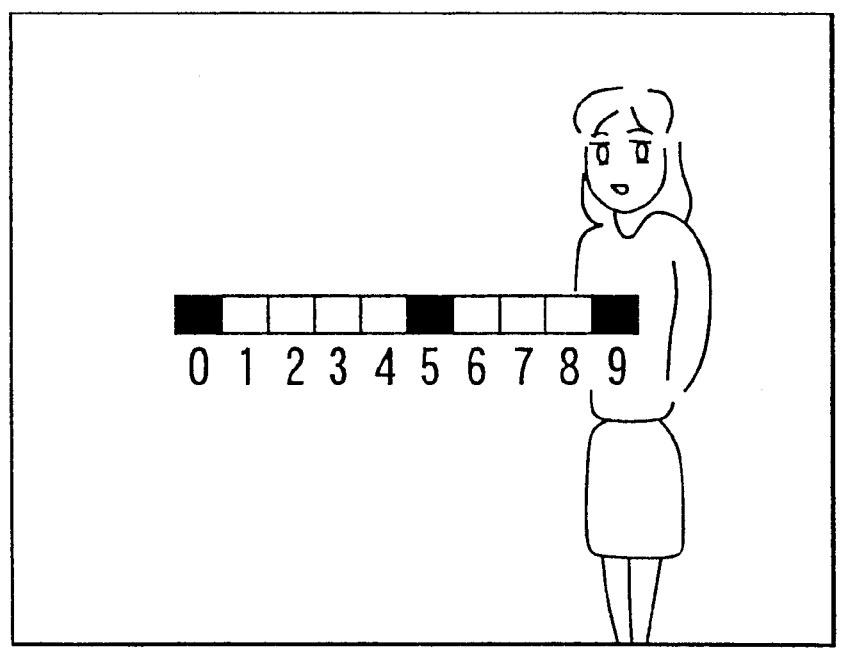

For example, as shown in FIG. 4B, it is possible to design so that the light from IRED can be projected only onto the blocks 0, 5 and 9 among the sensor blocks corresponding to the various positions in the picture. For this purpose, a IRED-chip having three light-emitting portions may be mounted in the package of IRED 3 in FIG. 1, and energy may be selectively supplied to each light-emitting portion by a light projecting circuit 4. In this case, the blocks 0, 5 and 9 are in auxiliary light positions.

In Step S19, when some block is not in an auxiliary light position, it is judged that there is a main object with a low probability in the block, the sequence is branched from Step S19 into N, and the block is excluded from the distance measurement objects by fixing the distance Ln to 100 m in Step S23. By reducing the distance measurement objects in number by such a method, the distance measurement speed can be increased. Further, when some block is judged to be in an auxiliary light position in Step S19, the operation proceeds to Step S20, and after auxiliary light has been projected, re-integration is performed. If light component other than signal light is removed in the standing light removing circuit 5 in FIG. 1 at this time, a reflected signal light image is formed on the sensor array 6a according to the principle of active AF irrespective of the contrast of the object. In next Step S21 image patterns are obtained by reading out the output of the sensors as in Step S2. And in next Step S14 a distance measurement result Ln is obtained by performing distance measurement from the positions of two images according to the principle in FIGS. 6A and 6B. By selecting the shortest distance from the distance measurement result at each point, a main object distance Lp is obtained (Step S15). In Step S16 n is incremented, in Step S17 it is judged whether n is larger than 9 or not, and till n reaches 9, Step S11 and the following steps are repeated, and when n is over 9, the operation is returned.

According to the second embodiment described above, since it is judged whether such image patterns as changes of light and shade are suitable for the main object by using an image detecting means used as passive AF sensor, and since the distance measurement position or the distance measurement mode is selected according to the result of the judgment, a fast and precise focus adjustment can be realized without the influence of the background having a high contrast even in a scene as shown in FIG. 2A or 2C.

That is to say, in this embodiment, since photographing conditions are estimated, a correct object position, that is, distance measurement points are determined, and a suitable distance measurement result is obtained by taking the image patterns obtained by the sensor arrays for passive AF into consideration, a AF camera being capable of adjusting the focus fast and precisely can be provided. And, since the most suitable distance measurement mode is selected by judging the image patterns, a more precise distance measurement becomes possible.

(Third Embodiment)

Figure 5A:
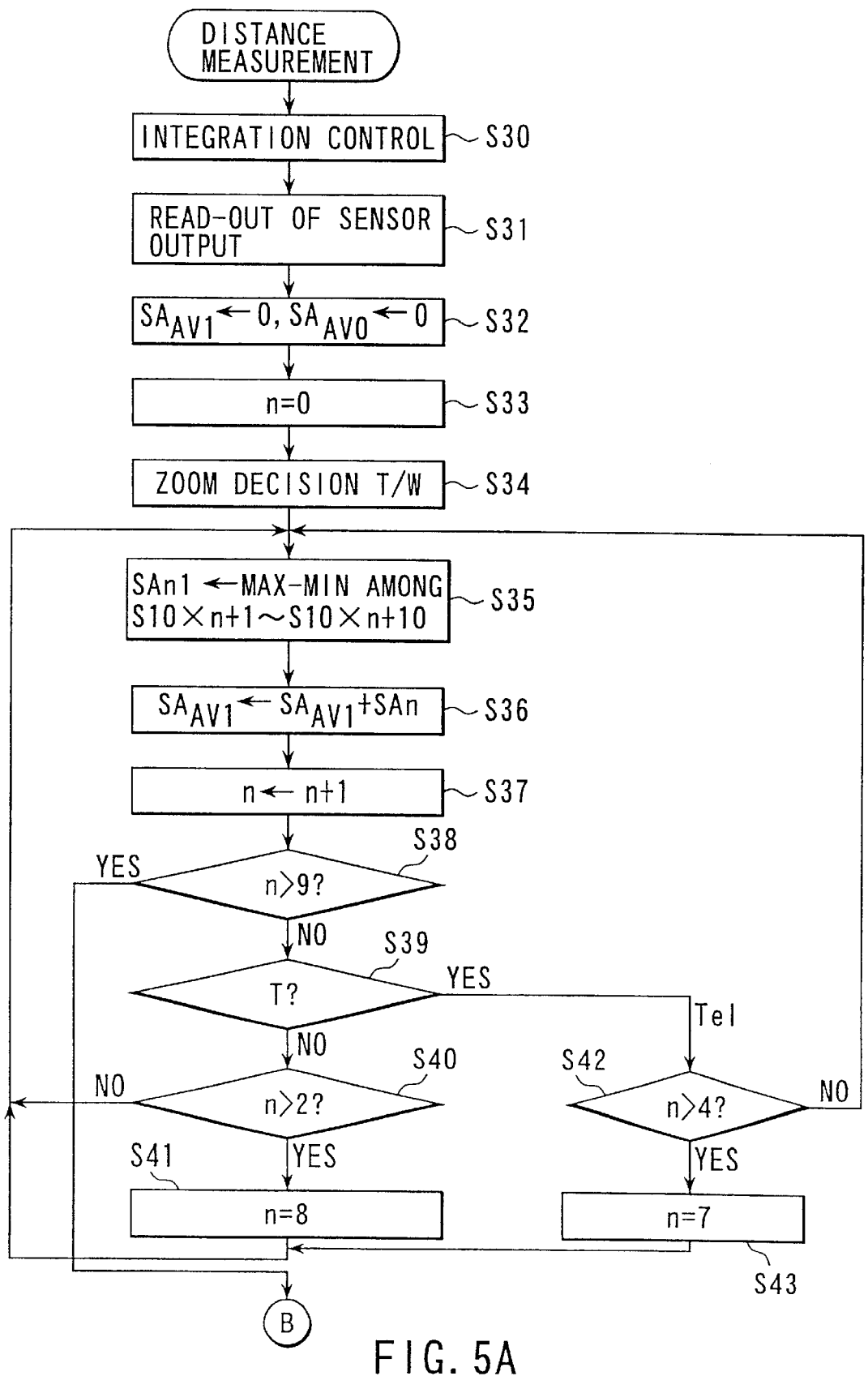
FIGS. 5A and 5B are flow charts illustrating a method of bringing an object into focus according to the third embodiment of the present invention respectively.
Figure 5B:
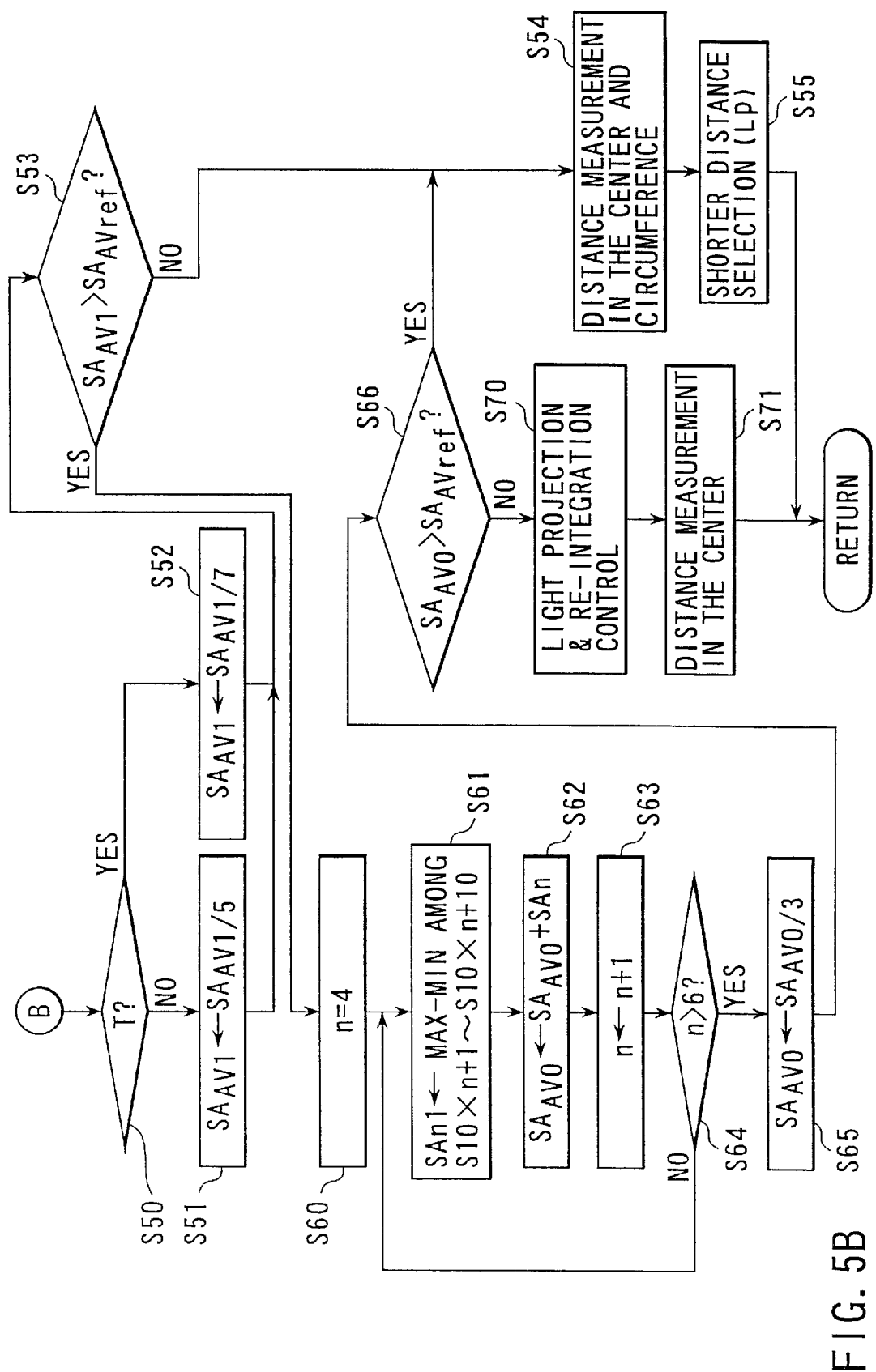

Now, the third embodiment according to the present invention will be described with reference to FIGS. 5A and 5B. In the second embodiment the contrast value of each block is compared with the average value of the contrast values in all the blocks. In this embodiment, however, various photographing conditions can be coped with by setting a predetermined value or by comparing the contrast values in the center and in the circumference of the picture after having taken the angle of view of the photographing lens.

Figure 2E:
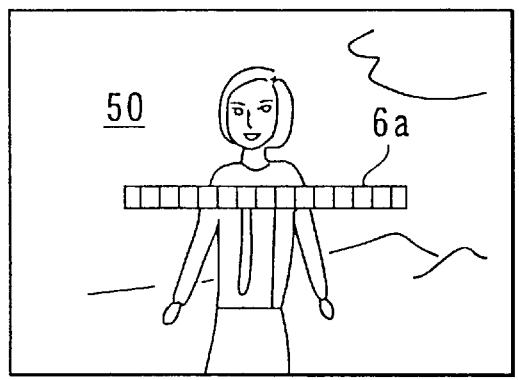

That is, in the sequence shown in the flowcharts described in FIGS. 3A and 3B, the face of a human figure 20 has a higher contrast than the average contrast in a low contrast scene having sky 50 in the back ground as shown in FIG. 2E, the sequence is branched into N in Step S11, and the face of a human figure 20 is excluded from the distance measurement objects, and therefore, an additional flow of which description has been omitted is required in addition to Steps S22 and S24. For example, it is desirable to add a flow in which the average contrast SAAV is compared with the predetermined value after Step S9, in which Step S10 and the following steps are performed only when the average contrast SAAV is higher, and in which the distance is measured only with respect to the three points auxiliary light can be projected onto in the other cases. Now, this flow will be described.

As in the second embodiment, after integration control (Step S30), the read-out of the sensor output (Step S31) or the like is performed, and the sequence proceeds to next Step S32. Here, in the third embodiment, in order to detect the average contrast in the circumference and in the center respectively, two data storage locations storing a variable for center SAAV0 and a variable for circumference SAAV1 are provided. In this step these two variables are initialized, and in next Step S33 the variables n representing the blocks of the sensors are initialized.

In the flow from Step S35 to Step S43, blocks for deciding the circumference are changed over to other ones corresponding to the zooming condition of the lens, and the average contrast SAAV1 is found.

That is, as is obvious from the comparison of FIG. 2A and FIG. 2C, the position monitored by the distance measuring sensor arrays for detecting images in the picture is wide in the tele condition, and is narrow in the wide condition. The reason is that the distance measuring optical system is not zoomed in general, but that only the photographing optical system changes its field of view. That is, the circumferential range is wide in the tele condition, and is narrow in the wide condition. So, it is judged whether the angle of view is nearer to the tele condition or to the wide condition according to the result of Step S34 in Step S39, and according to the result of the judgment the number of the blocks taken into consideration for deciding the contrast is changed over.

That is, the judgement in Step S39 means in the tele condition that the blocks 0 to 3 and 7 to 9 are decided to be circumferential ranges according to the results of the judgement of Steps S42, S43 and S38. And the average of the contrast values in these blocks is calculated as SAVA1 in Steps S51 and S52.

Figure 2F:
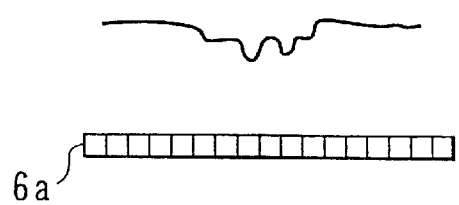

And, when this value (SAAV1) shows a lower contrast as a result of the comparison of this value and the predetermined contrast value SAAVref in Step S53, the distances to all the points (in the center and in the circumference) are measured equally (Step S54), and a shorter distance is selected (Step S55). By using such a method, even if a scene to be filmed is a scene as shown in FIG. 2E, the main object can be brought into focus precisely due to a high contrast of the main object as shown in FIG. 2F.

On the other hand, since the scene can be judged to be a scene as shown in FIG. 2A or 2C when the sequence is branched into Y in Step S53, the average contrast SAAV0 in the center (blocks 4, 5 and 6) is found and compared with the predetermined contrast (Step S66).

When the result of the comparison at this time is YES, that is, when the contrast is as high in the center as in the circumference, the sequence is branched into Step S54, and each point is evaluated equally. On the other hand, since the scene is a scene as shown in FIG. 2A or 2C when the judgment in Step S66 is NO, that is, when the contrast in the center is lower, the sequence proceeds to Step S70, and after having raised the accuracy of the distance measurement by auxiliary light projection and re-integration, the result of the distance measurement in the center is determined as a focus adjusting distance Lp (Step S71).

According to the third embodiment described above, since the position of the main object is adapted to be determined by taking the angle of view in consideration and by comparing the contrast in the circumference and in the center with the predetermined contrast, the distance is not measured imprecisely, and a precise focus adjustment is possible, even if the face of a human figure having a low contrast is in the complex background.

According to the present invention, since the distance measuring apparatus or the distance measuring mode is adapted to be selected by judging the suitability as a main object based upon the change of the image patterns, a distance measuring apparatus being capable of adjusting the focus fast and precisely can be provided.

Further, according to the present invention, since the distance measuring objects can be reduced in number, the distance measuring speed can be increased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-point distance measuring apparatus comprising:
   a light source capable of projecting distance measuring light onto an object;
   a sensor array that detects an image pattern of each of a plurality of distance measuring points in an image; and
   a control circuit that determines whether or not distance measuring light should be projected from said light source onto each of the plurality of distance measuring points, based on output signals from the sensor array;

wherein said light source is controlled to project the distance measuring light onto limited points among the plurality of distance measuring points; and wherein the output signals, based on which said control circuit determines whether or not the distance measuring light should be projected, are output signals from predetermined parts of said sensor array corresponding to said limited points among the plurality of distance measuring points.

2. The multi-point distance measuring apparatus according to claim 1, wherein:

said limited points among the plurality of distance measuring points are in a central region of said image.

3. multi-point distance measuring apparatus according to claim 1, wherein:

said limited points among the plurality of distance measuring points are in a central region and in a circumferential region of said image.

4. The multi-point distance measuring apparatus according to claim 1, wherein:

said control circuit determines whether or not said light source should project said distance measuring light after judging that a distance can not be measured only using the image patterns obtained by said sensor array.

5. The multi-point distance measuring apparatus according to claim 1, wherein:

said control circuit prevents said light source from projecting said distance measuring light after judging that a distance can be measured only using the image patterns obtained by said sensor array.

6. A multi-point distance measuring apparatus comprising:

a light source capable of projecting light onto an object;

first judging means for judging a point among a plurality of points in an image of the object having a contrast higher than a predetermined level;

second judging means for judging whether or not measurement of distances to said plurality of points in the image of the object are possible;

third judging means for judging whether or not measurement of the distances to said plurality of points in the image of the object are possible using light projected from said light source; and a control circuit for determining availability of a distance measurement point according to a result of judgment by at least one of the first, second and third judging means.

7. A multi-point distance apparatus comprising:

a light source capable of projecting light onto an object;

two line sensors adapted to respectively receive divided two images and output image patterns; and a control circuit that selectively changes between: (i) a passive distance measuring mode for measuring a distance to an object based on the image patterns outputted from said two line sensors, and (ii) an active distance measuring mode for measuring the distance to the object based on a receiving position on said line sensors of light which has been projected by said light source and reflected from the object;

wherein said control circuit changes between said passive distance measuring mode and said active distance measuring mode on a block by block basis, based on a shape of the image patterns outputted by said line sensors.

8. The multi-point distance measuring apparatus according to claim 7, wherein:

said control circuit divides an output of said line sensors into blocks, compares a contrast value in each block with an average value of contrast values in all the blocks, decides whether or not a distance corresponding to each block can be measured, and changes between said passive distance measuring mode and said active distance measuring mode per said each block.

9. The multi-point distance measuring apparatus according to claim 8, wherein:

said control circuit judges a main object based on an output value of said line sensors per each block.

10. A distance measuring apparatus comprising:

detecting means for detecting image data of a plurality of points in an image; and determining means for determining that distance measurement should be performed with high priority regardless of a contrast value output by the detecting means in a first area of the plurality of points, and for determining that distance measurement should be performed with reduced priority when a contrast value output by the detecting means in a second area different from the first area is at a level other than a predetermined contrast level.

11. The distance measuring apparatus according to claim 10, wherein:

said determining means determines that a contrast value of a point in the second area is not suitable for a main object position when the contrast value of the point is higher than a predetermined contrast value.

12. The distance measuring apparatus according to claim 10, further comprising:

light projecting means capable of projecting distance measuring light onto an object; and control means for causing the light projecting means to project the distance measuring light when a contrast value of a distance measurement point in the first area is lower than a predetermined contrast value.

* * * * *